United States Patent [19]

Noetzel

[11] Patent Number: 5,589,836

[45] Date of Patent: Dec. 31, 1996

[54] METHOD FOR SELECTING SIGNALS FROM NAVIGATION SATELLITES

[75] Inventor: Guenter Noetzel, Dickholzen, Germany

[73] Assignee: Robert Bosch GmbH, Stuttgart, Germany

[21] Appl. No.: 398,701

[22] Filed: Mar. 6, 1995

[30] Foreign Application Priority Data

Apr. 29, 1994 [DE] Germany .......................... 44 15 083.0

[51] Int. Cl.⁶ .............................. H04B 7/185; G01S 5/02
[52] U.S. Cl. ................................................................ 342/357
[58] Field of Search ............................ 342/357; 455/12.1

[56] References Cited

U.S. PATENT DOCUMENTS

| | | | |
|---|---|---|---|
| 4,899,285 | 2/1990 | Nakayama et al. | 364/453 |
| 4,912,645 | 3/1990 | Kakihara et al. | 364/449 |
| 4,949,268 | 8/1990 | Nishikawa et al. | 364/449 |
| 5,144,318 | 9/1992 | Kishi | 342/357 |
| 5,185,610 | 2/1993 | Ward et al. | 342/357 |
| 5,307,277 | 4/1994 | Hirano | 364/449 |
| 5,341,301 | 8/1994 | Shirai et al. | 364/449 |
| 5,446,465 | 8/1995 | Diefes et al. | 342/357 |

FOREIGN PATENT DOCUMENTS

| | | |
|---|---|---|
| 40 02 176 A1 | 8/1990 | Germany . |
| 41 42 403 A1 | 7/1992 | Germany . |

*Primary Examiner*—Theodore M. Blum
*Attorney, Agent, or Firm*—Kenyon & Kenyon

[57] ABSTRACT

In a method and apparatus for selecting signals from navigation satellites, a selection is performed on signals which are directly or indirectly received from navigation satellites. Since the indirectly received satellite signals result in a false determination of position, they are suppressed. The selection is carried out for a satellite receiver, whose antenna is mounted, for example, in a vehicle in the vicinity of the rear window or the front windshield. A receiving range of the antenna is determined on the basis of the antenna location. Of the received satellite signals, those signals whose satellites are situated within the receiving range of the antenna are separated at this point. The satellites situated within the receiving range are recognized on the basis of the satellite orbits, which are stored, for example, in a storage device of the receiver.

10 Claims, 2 Drawing Sheets

METHOD FOR SELECTING SIGNALS FROM NAVIGATION SATELLITES

FIELD OF THE INVENTION

The present invention relates to a method and an apparatus for selecting signals received from navigation satellites, for example, from the GPS, GLONASS or similar satellite systems.

BACKGROUND INFORMATION

To determine instantaneous position, signals are evaluated from several satellites, which revolve around the earth on fixed, predetermined orbits. On the basis of delay measurements, a receiver can determine the exact distance to the satellite, whose current position is known in the receiver (for example, from data transmitted by the satellite to the receiver). The information received as to the position of three satellites and the distance to them is sufficient to allow an exact and clear determination of the location of the receiver within an accuracy range of a few meters. If the receiver is located, for example, in a motor vehicle, whose vehicle parts partially shadow, i.e., block, the receiving range, then not all satellites seemingly suited for determining position can be received. On the other hand, due to reflections off of house walls or hills, it can happen that satellite signals, which simulate a false satellite position, are received. The receiver itself, however, is not able to differentiate among these different signals, so that incorrect position determinations are sometimes made. Such incorrect determinations are not desirable, since they can adversely affect the reliability of the device to a considerable extent.

SUMMARY OF THE INVENTION

An advantage of the method and apparatus according to the present invention is that, in actuality, the only signals that are evaluated are those which come from satellites located in the visibility range, i.e., direct receiving range, of the antenna and, therefore, fall directly on the antenna. The reflected signals from satellites, which do not lie within the direct receiving range of the antenna, are suppressed. In this manner, the reliability of the position determination is advantageously increased.

It is especially advantageous that by repeatedly defining the size or the width of the direct receiving range, the recognition field for the satellites is optimized, so that depending on the direction of travel and the point in time, all satellites located within the direct receiving range of the antenna can be used for determining position.

The direct receiving range is optimized by comparing a direct receiving range that is newly determined from repeated measurements with a previous, stored direct receiving range, so that through several measuring tests, the largest possible direct receiving range is determined in dependence upon the direction of travel.

Since the orbits of the satellites establish which ones can be received, —depending on the direction of travel of the vehicle—only very specific satellites are received at a certain point in time. Therefore, to determine the direction of travel of the vehicle, vehicle sensors or a suitable compass are advantageously used. However, it is also possible to derive the direction of travel from the satellite signals themselves, for example, by evaluating the Doppler shift of the carrier frequency.

A Global Positioning System (GPS) receiver is advantageously used for a map-supported navigation, to control or, in some instances, to correct the position of the vehicle-navigation device.

An advantageous place to install the antenna of a GPS receiver is, for example, inside the vehicle near the rear window or the front windshield. The antenna can also be mounted so as to be hidden under the rear shelf or the dashboard, so that it is not visible and is, therefore, also protected from damage.

DETAILED DESCRIPTION

Figure 1:
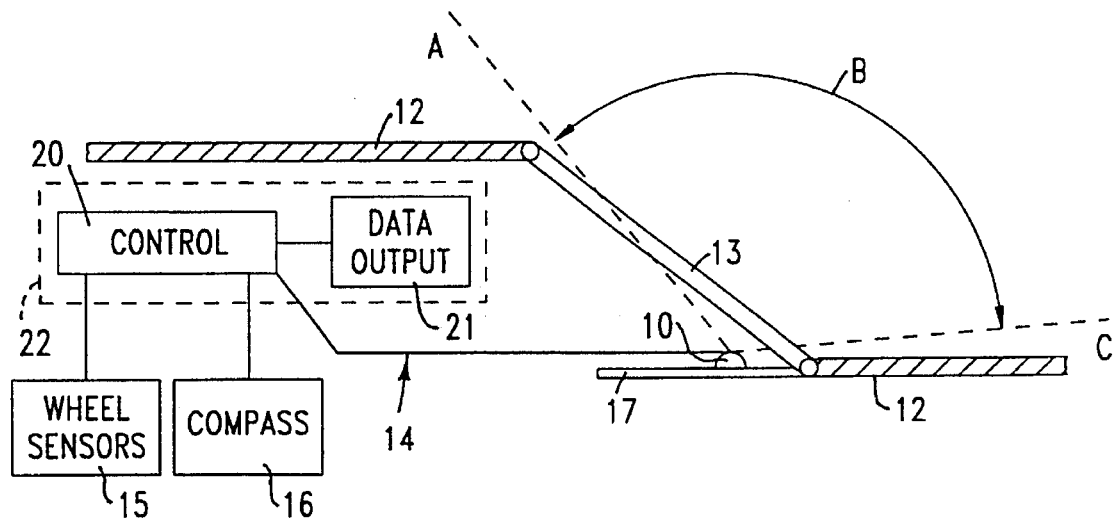
FIG. 1 shows a schematic diagram of an exemplary arrangement of the antenna in a vehicle.

FIG. 1 schematically depicts the arrangement of an antenna 10 in a vehicle 14. In the sectional view of FIG. 1, the vehicle parts 12 depicted are the roof and tailgate. In addition, a rear window 13 is discernable, behind which on a rear shelf 17 is mounted, for example, an antenna 10 of a GPS receiver 22. The antenna 10 is partially shadowed by the vehicle parts 12, so that the rear window 13 provides only a restricted receiving range B. Signals from the adjacent ranges A and C cannot be received by the antenna 10, as the vehicle parts 12 shield it from these signals. Thus, the antenna 10 can receive the signals from those GPS satellites that are positioned within the receiving range B. Of course, also falling within this receiving range B are such signals transmitted by satellites situated outside of this receiving range, whose signals are reflected, for example, off of house walls, hills, etc. These signals corrupt the position determination and are, therefore, not desirable.

Also depicted schematically in FIG. 1 is a GPS receiver 22, which has a control 20, as well as a corresponding data output 21. The control is preferably linked, for example, to one or more wheel sensors 15 or to a compass 16. The wheel sensors 15 or the compass 16 can thus input the direction of travel or the northerly direction of the vehicle into the GPS receiver 22. The GPS 22 is known per se and, therefore, does not need to be described. In place of the wheel sensors 15, suitable inertia sensors (gyrometers) can also be used. Also, the direction of travel can be determined from the satellite signals, for example, by measuring the Doppler shift or the carrier phase.

Figure 2:
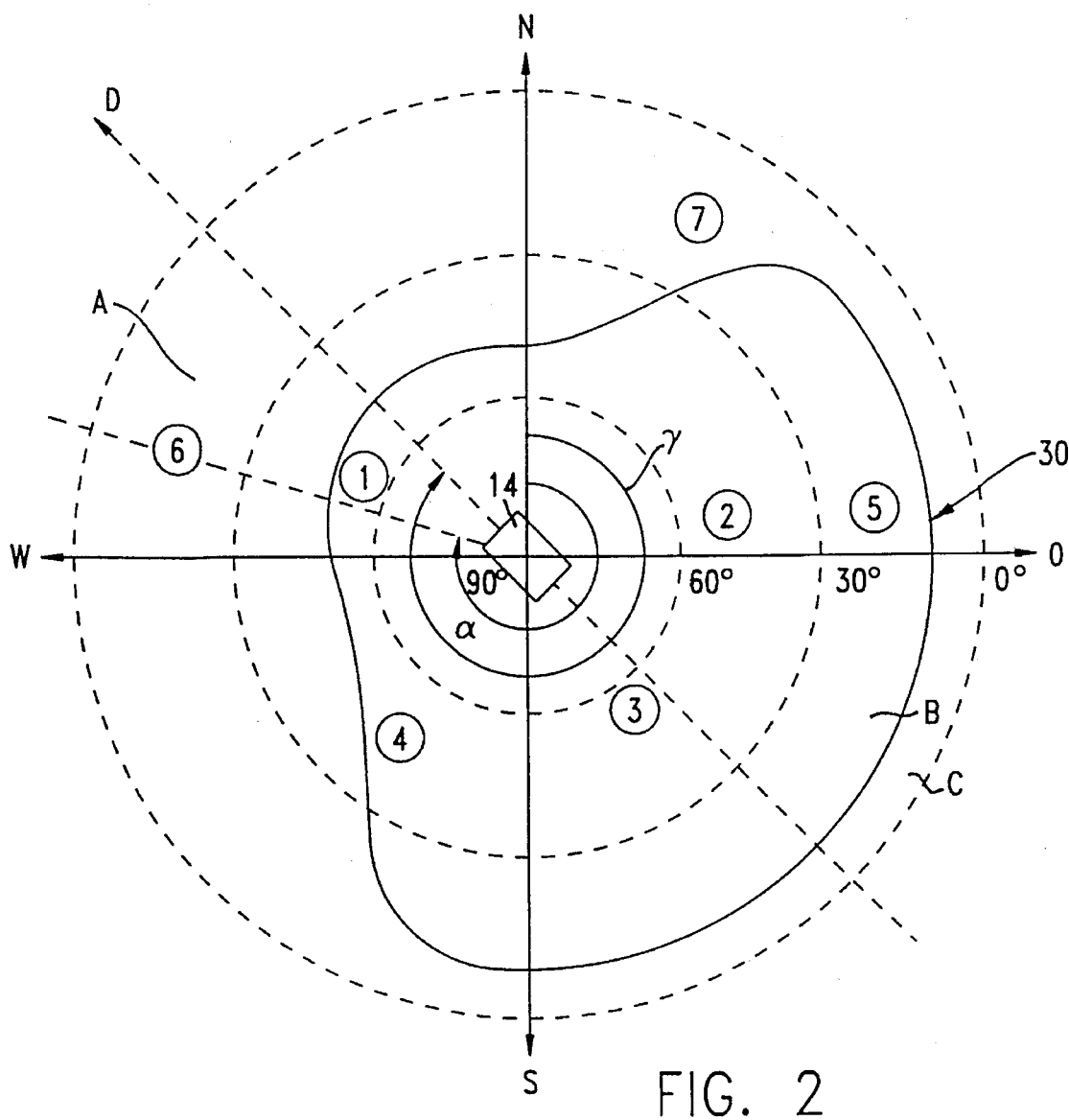
FIG. 2 depicts a projection of a receiving range.

FIG. 2 depicts the projection of a receiving range B, which is delimited by the curve 30. The curve 30 reveals the receiving range B for the selected arrangement of the antenna 10 behind the window 13. For example, the vehicle 14 is situated in the middle of the axis intersection N, E, S, W and travels in the direction of travel D. Circles corresponding to the elevation angles 30°, 60° and 90° are drawn in with dotted lines around the vehicle. Navigation satellites 1 through 7, which orbit the earth, are arranged schematically in the axes of coordinates. The satellites have an elevation angle of between 30° and 90°. For example, satellites 1 and 3 are situated in the West-North-West or South-East direction with 60° elevation; satellites 2 and 4 have an elevation of 40° to 50°; and satellites 5, 6 and 7 reside deep at an elevation below 30°. Thus, within the receiving range B, a maximum of satellites 1 through 5 can be directly received, while satellites 6 and 7 cannot be received or only indirectly received. The receiving quality of satellites 1 through 5, which are able to be received, is still dependent upon the relative position to the receiving antenna 10, so that as a rule, not every one of these five satellites is used to evaluate its signals.

Figure 3:
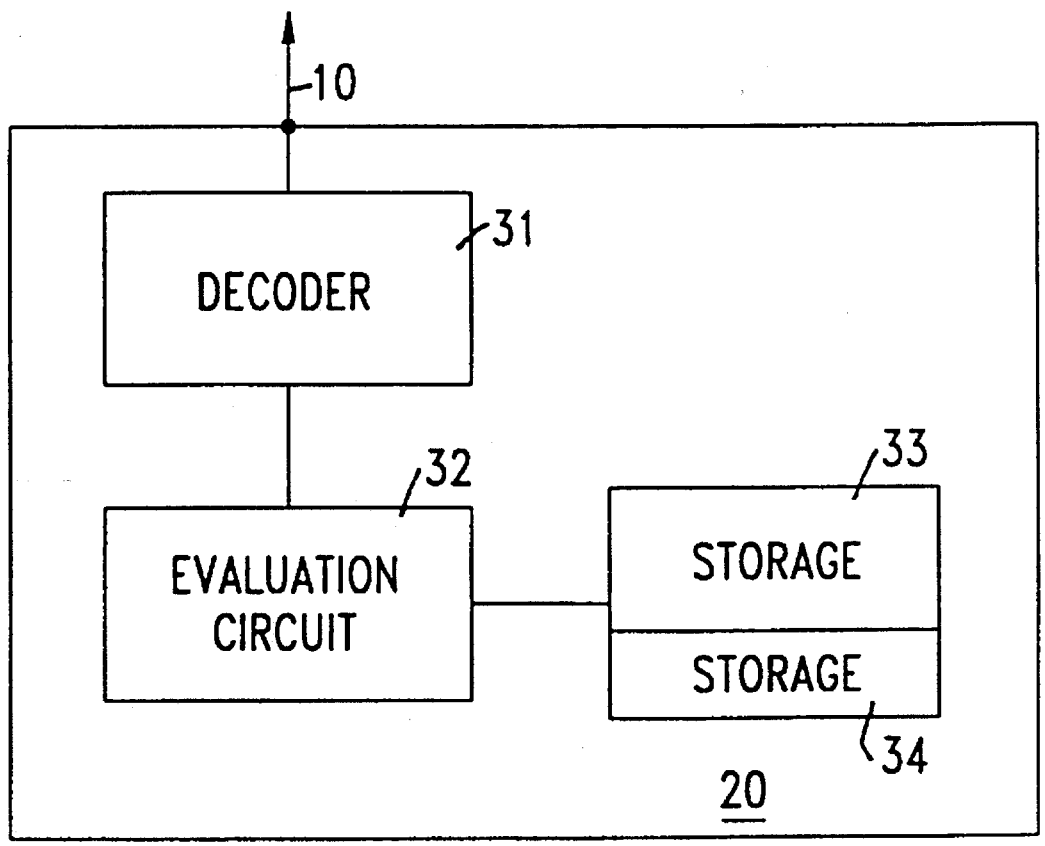
FIG. 3 illustrates a block diagram of a GPS receiver.

FIG. 3 schematically depicts the control 20 of a GPS receiver 22. The antenna 10 on this receiver is connected to a decoder 31, which routes the decoded signals to an evaluation circuit 32. The evaluation circuit 32 has a first storage area 33, in which are stored code names for those satellites which are able to be received, as well as their orbits. Furthermore, the evaluation circuit 32 is linked to a second storage area 34, in which travel-direction-dependent receiving ranges B of the antenna 10 are stored.

The respective methods and corresponding receiving devices for carrying out the selection of directly incident, reflected, and indirectly incident signals will be clarified in greater detail in the following on the basis of the exemplary embodiment. The assumption is made with respect to FIG. 2 that the vehicle is situated in the coordinate midpoint and travels in the direction of travel D, as shown by the dotted-line arrow. It can thus be inferred from the receiving range B that the vehicle device receives satellites 1 through 5 directly, since these satellites are situated in the receiving range for the antenna 10. The assumption is also made that the signals are received in the ranges A or C from satellites 6 and 7, since their signals enter into the receiving range B by means of reflection.

The GPS receiver 22 cannot determine of its own accord whether the signals from satellites 1 through 7 are directly or indirectly incident. To determine the directly incident satellite signals, first the direction of travel D of the vehicle 14 is calculated. On the basis of the direction of travel D, the evaluation circuit 32 extracts from the second storage device 34 the corresponding values for the receiving range B, which had previously been empirically determined, for example, and stored in dependence upon the direction of travel.

The names and orbits of the satellites are stored in the first storage area 33, so that it can be determined at any specific time, which of the stored satellites are situated in the receiving range B of the vehicle. The evaluation circuit 32 establishes, for example, with respect to the situation described in FIG. 2, that satellites 1 through 5 are situated at that moment in the receiving range B. Thus, evaluation circuit 32 can draw all together or partially upon the signals of satellites 1 through 5 to determine position. The indirectly incident signals from satellites 6 and 7 are suppressed in so doing.

If the direction of travel D of the vehicle 14 changes, then, as a result, the position of the receiving range B relative to the satellites also changes. If so indicated, other satellites can now be received in the new receiving range, such that only the directly incident signals will be selected from the received signals.

The receiving range B is determined by the spatial configuration of the antenna 10 in the vehicle 14. It is a function of the volume, which is generated from the height angle and the width angle. Since the satellite signal can be deflected in the boundary area next to the vehicle parts 12 due to diffraction and reflection, an optimization of the receiving range B is provided. In principle, the receiving range can be determined empirically for each direction of travel and the corresponding values can be filed in the second storage device 34.

For purposes of optimization, it is advantageous during travel in the same direction to make several measurements with respect to receiving the satellites, if at all possible, in one area having minimal reflection. In so doing, the signals from those satellites which are located right at that moment in the receiving range B are decoded. Given a continued travel in the same direction, these satellites can be received for a certain period of time. It can happen that indirectly incident signals fail to appear or are received as only very weak signals. Thus, by making a comparison with previously stored measurements, one can establish an optimal range for the receiving range B, which is possibly smaller than the range delimited by the vehicle parts 12. The thus optimized receiving range B is then used for the further selection of the satellite signals.

A further refinement of the present invention provides for the entire receiving range to be subdivided into sub-ranges on the basis of the elevation and angle parameters relative to the direction of travel. A count cell is assigned to each of these segments. If a satellite is expected in one segment in accordance with its current position and the current direction of travel, but cannot be received, then the corresponding count cell is counted down. However, if the satellite is received, as expected, the count cell is counted up. The counter contents of the individual segments are converted by applying the number of counts made in the sub-range into a relative value. A threshold value can then be defined (for example, 75%), which gives evidence of whether a segment lies within the receiving range or outside of it. This is clarified in greater detail on the basis of the following example.

In accordance with FIG. 2, the satellite 6 has the direction angle (azimuth angle) $\alpha \approx 290°$ and the elevation angle $\beta_6 26$ 15°. The vehicle 14 has a travel angle $\approx 315°$, i.e. relative to the vehicle 14, the azimuth angle of the satellite 6 amounts to about 280°–315°=–35°, or in the positive value range between 0 and 360°, the angle +325° results. The relative position of the satellite 6 to the vehicle antenna 10 is, therefore, 325°/15°. However, since the position 325°/15° is out of range B it usually will not be received. So counter of the according sub-range counted down.

On the other hand, the satellite 5 has the coordinates 80°/15° or, relative to the vehicle, 80°–315°=–235° or +125°. The position is thus 125°/15°. It lies within range B and will be received. So, the counter for this sub-range is counted up. In this manner, given repeated measurements, one obtains a frequency distribution. If, in so doing, a satellite is measured in one sub-range more frequently than, for example, 75%, then one starts out from the assumption that its signals were received directly. If, however, a satellite is measured in a subrange less frequently than 75%, then its signals were probably only reflected signals,

What is claimed is:

1. A method for selecting signals from navigation satellites, comprising the steps of:

arranging an antenna of a vehicle at a location for receiving, directly and indirectly, signals transmitted by the navigation satellites;

determining a momentary direction of travel of the vehicle;

determining a momentary direct receiving range of the antenna relative to the momentary direction of travel of the vehicle;

determining which of the navigation satellites are located within the momentary direct receiving range of the antenna;

selecting received signals, corresponding to those navigation satellites that are determined to be located within the momentary direct receiving range of the antenna, from the directly and indirectly received signals;

evaluating the selected received signals; and determining a position of the vehicle as a function of the selected signals.

2. The method according to claim 1, further comprising the steps of:

defining and storing at least one of a size and a width of the momentary direct receiving range of the antenna relative to the momentary direction of travel of the vehicle.

3. A method for selecting Signals from navigation satellites, comprising the steps of:

arranging an antenna of a vehicle at a location for receiving, directly and indirectly, signals transmitted by the navigation satellites;

determining a momentary direction of travel of the vehicle;

determining a momentary receiving range of the antenna relative to the momentary direction of travel of the vehicle;

determining which of the navigation satellites are located within the momentary receiving range of the antenna;

selecting received signals corresponding to those navigation satellites that are determined to be located within the momentary receiving range of the antenna;

evaluating the selected received signals;

determining a position of the vehicle as a function of the selected signals; and dividing the momentary receiving range into sub-ranges; counting a number of occurrences of the received signals falling in at least one of the sub-ranges; and evaluating the number of occurrences of selected signals as a measure for at least one of the directly and indirectly received satellite signals.

4. The method according to claim 1, wherein the direction of travel of the vehicle is determined using at least one of vehicle sensors, an inertia sensor, the selected signals, and a compass.

5. The method according to claim 1, further comprising the step of:

correcting a position of a vehicle navigation device using the determined position of the vehicle.

6. An apparatus for selecting signals from navigation satellites, comprising:

an antenna, arranged in a vehicle for receiving direct and indirect signals from the navigation satellites, having a limited direct receiving range;

a first storage area for storing code names and orbit data for the navigation satellites;

a second storage area for storing values for the direct receiving range of the antenna dependent upon a direction of travel of the vehicle; and an evaluation circuit for determining which of the navigation satellites are situated in the direct receiving range of the antenna as a function of the code names, the orbit data, and the values for the direct receiving range of the antenna.

7. The apparatus according to claim 6, further comprising at least one of wheel sensors, an inertia sensor, and a compass for determining a change in the direction of travel of the vehicle.

8. The apparatus according to claim 6, wherein the antenna is arranged on an inner side of at least one of a rear window and a front windshield of the vehicle.

9. The apparatus according to claim 6, wherein the antenna is arranged so as to be hidden under at least one of a rear shelf and a dashboard of the vehicle.

10. The apparatus according to claim 6, wherein the apparatus is electrically coupled to a vehicle-navigation device.

* * * * *